United States Patent [19]

Caponetto et al.

[11] Patent Number: 6,061,672
[45] Date of Patent: May 9, 2000

[54] FUZZY LOGIC NEURAL NETWORK MODULAR ARCHITECTURE

[75] Inventors: Riccardo Caponetto, Catania; Luigi Occhipinti, Ragusa; Luigi Fortuna, Siracusa; Gabriele Manganaro; Gaetano Giudice, both of Catania, all of Italy

[73] Assignees: SGS-Thomson Microelectronics S.r.l., Agrate Brianza; Consorzio per la Ricerca sulla Microelettronica nel Mezzogiorno, Catania, both of Italy

[21] Appl. No.: 08/953,158

[22] Filed: Oct. 17, 1997

[30] Foreign Application Priority Data

Oct. 17, 1996 [EP] European Pat. Off. .............. 96830534

[51] Int. Cl.$^7$ ....................................................... G06N 3/04
[52] U.S. Cl. .................................... 706/2; 706/4; 706/10; 706/12
[58] Field of Search ................................ 706/2, 4, 10, 12

[56] References Cited

PUBLICATIONS

European Search Report from European Patent Application 96830534.2, filed Oct. 17, 1996.
Proceedings of the Fourth International Conference on Microelectronics For Neural Networks And Fuzzy Systems, Turin, Italy, Sep. 26–28, 1994, ISBN 0–8186–6710–9, 1994, Los Alamitos, CA, USA, IEEE Comput, Soc. Press, USA pp. 163–169, Privat G. et al., "Analog VLSI Cellular Fuzzy Automata Networks For Relaxation Labeling".
Applications of Artificial Neural Networks In Image Processing, San Jose, CA, USA, Feb. 1–2, 1996, vol. 2664, Proceedings of The Spie—The International Society For Optical Engineering, 1996, USA, pp. 64–74, Rao D.H. et al., "Fuzzy Cellular Neural Network For Image Enhancement".
Parallel Computing, vol. 21, No. 5, May 1, 1995, pp. 803–823, Cannatara M. et al., "A Parallel Cellular Automata Environment on Multicomputers For Computational Science".

Yang, et al., "Fuzzy Cellular Neural Networks: Applications", Cellular Neural Networks and Their Applications, Jun. 1996. CNNA—96. Proceedings., 1996 Fourth IEEE International Workshop on, pp. 225–230.

Yang, et al., "Application of Fuzzy Cellular Neural Networks to Euclidian Distance Transformation", Circuits and Systems I: Fundamental Theory and Applications, IEEE Transactions on, vol. 44 3, pp. 242–246, Mar. 1997.

Colodro, F., et al, "Cellular Neuro–fuzzy networks (CNFNs), a new class of cellular networks.", Fuzzy Systems, Jan. 1996., Proceedings of the Fifth IEEE International Conference on, vol. 1, pp. 517–521 vol. 1.

Thiran, P., et al, "Dynamics of Pattern Formation in Cellular Neural Networks", Neuro–Fuzzy Systems, Jan. 1996. AT'96., International Symposium on, pp. 1–7.

Blonda, P., et al, "Modular Neural System, Based on a Fuzzy Clustering Network, For Classification", Geoscience and Remote Sensing Symposium, Jan. 1995. IGARSS '95. 'Quantitative Remote Sensing for Science and Applications', International, vol: 1, Page(s).

(List continued on next page.)

*Primary Examiner*—Eric W. Stamber
*Assistant Examiner*—Wilbert Starks
*Attorney, Agent, or Firm*—Wolf, Greenfield & Sacks, P.C.; James H. Morris; Theodore E. Galanthay

[57] ABSTRACT

The invention relates to a modular architecture of a cellular network for improved large-scale integration, of the type which comprises a plurality of fuzzy cellular elements ($C_{m,n}$) interconnected to form a matrix of elements having at least m rows and n columns, the row and column numbers describing the location of each element. Each fuzzy processor is adapted for connection to other processors of the same type such that a parallel architecture of the modular type can be implemented. The management of the architecture is facilitated by each submatrix being controlled by an individually dedicated fuzzy processor device.

17 Claims, 6 Drawing Sheets

OTHER PUBLICATIONS

Tseng, L.Y., et al., "A Modular Design of Fuzzy Neural Network With Application to Telecommunication Network Management Control", Neural Networks, Jan. 1995. Proceedings., IEEE International Conference on, vol. 3, pp. 1363–1368 vol. 3.

Shan, Z., et al., "Plant Identification and Performance Optimization for Neuro–Fuzzy Networks", Systems, Man and Cybernetics, Jan. 1996., IEEE International Conference on, vol. 4, pp. 2607–2612 vol. 4.

Yang, et al., "Fuzzy Cellular Neural Networks: Theory", Cellular Neural Networks and Their Applications, Jun. 1996. CNNA—96. Proceedings., 1996 Fourth IEEE International Workshop on, pp.: 181–186.

FUZZY LOGIC NEURAL NETWORK MODULAR ARCHITECTURE

BACKGROUND OF THE INVENTION

1. Field of the Invention

This invention relates to a modular architecture of a cellular network for integration on semiconductor circuits using large-scale integration technology. A cellular network includes a plurality of cellular elements ($C_{m,n}$) interconnected together to form a matrix of elements having at least m rows and n columns, the row and column numbers describing the location of each element in the matrix.

The invention also relates to a device for processing fuzzy logics rules to control the temporal dynamic evolution of the state of such cellular elements.

The invention relates to, in particular, an architecture for cellular networks which is based on fuzzy logic and refers to a bi-dimensional plane on which said network is assumed to lie. The description to follow will cover this field of application for convenience of illustration only.

2. Discussion of Related Art

As pointed out by certain articles that have appeared in the scientific literature, such as COLLECTIVE BEHAVIOUR OF CELLULAR FUZZY SYSTEM FOR NEW PARADIGM OF COMPUTATION by S. Baglio, L. Fortuna, G. Giudice, and G. Manganaro, architectures which are based on fuzzy cellular elements identical with one another have a wide field of potential applications. Such architectures can process data in real time with high efficiency, and facilitate integration on semiconductor circuits intended for large volume production.

A first exemplary application of these architectures is represented by the solution of such hard mathematical problems as differential equations, or image processing. These first applications were originally based on the so-called "cellular automata" philosophy by Tofoli and Margolous, 1987, and subsequently on a philosophy set forth by Chua and Yang in an article "Cellular Neural Networks" (CNN's), 1988.

While both of the above philosophies point to the use of a cellular network, there still exists the problem of how to configure these architectures by the determination of a set of parameters, in order for them to serve their intended function.

Heretofore they have been designed, and the set of parameters determined, by assigning certain estimated starting values to the parameter of the cellular network, and using supporting simulators in order to determine any errors from the trials made.

This approach took into consideration the possibility of extending to cellular neural networks self-taught algorithms that could determine the optimum values of such parameters.

In the above-referenced scientific article, a novel approach to the use of cellular network-based architectures is proposed, wherein the duty of each cell in the cellular architecture is described by suitable language constructions or "fuzzy logic rules".

With this novel philosophy, a given problem is solved simultaneously as it is defined, because the behaviors of the fuzzy-type cells can be defined in language.

Purely as an example, consider the instance of a fuzzy cellular network consisting of a fuzzy cell matrix of m rows and n columns, all identical and interacting with one another.

Suppose that such a matrix is in biunivocal correspondence to a video image comprising a number of pixels equal to the number of cells in the matrix, so that a state variable can be associated with each cell which would take into consideration the brilliance of the individual pixel, for example.

The dynamic evolution of these state variables is defined by first $R_1$ and second $R_2$ sets of fuzzy logic rules defining the cell interactions within a given range.

It is indeed possible to define, for each cell $C_{m,n}$ in the fuzzy cellular network, a set of cells $N_2(m,n)=\{C_{k,1}:\max(|k-m|,|l-n|)\leq r\}$, which include the adjacent cells to the base cell within a range of radius r.

In the function that defines the range $N_2(m.n)$, max is an operator which gives back the largest of the values between brackets, while l and k are indexes identifying a generic cellular element.

The second set $R_2$ of rules applies to the state variables of the cells within the range of radius r.

The dynamic evolution of the individual cell is determined by a set of rules formed by the first and second sets ($R_1 \cup R_2$) combined, while the overall dynamic evolution of the fuzzy cellular network, as resulting from the mutual interactions of the m*n cells, is fixed by the second set $R_2$ alone.

For example, the state of a generic base cell $C_{m,n}$ can be described by the exemplary set of rules here below, either through fuzzy logics language constructions or algorithms which can be represented graphically by flow diagrams.

In the sets $R_1$ and $R_2$, the quantities subject to conditioning are the state variables $X_{m,n}(t)$, $X_{k1}(t) \in N_2$ and Range_of_$X_{m,n}(t)$.

The first state variable $X_{m,n}(t)$ defines the condition of the generic cell $C_{m,n}$ at a time t, while the state variable Range_of_$X_{m,n}(t)$ is dependent on the state $X_{k1}(t)$ of the adjacent cells to the base cell $C_{m,n}$ in a range of radius r.

Subsequently, said state variables are compared with the pre-selected membership functions of the set "universe of discourse", following their conversion to fuzzy quantities by the fuzzyfying process.

In the following example, "Low", "Medium" and "High" are the respective membership functions associated with the input variables, and "Small-positive" is one of the membership functions associated with the output variables.

SET $R_1$ . . .

IF $X_{m,n}(t)$ IS Low AND Range_of_$X_{m,n}(t)$ IS High THEN $X_{m,n}(t+1)$ IS Small-positive . . .

SET $R_2$ . . .

IF $X_{(m-1),n}(t)$ IS Low AND $X_{m,(n+1)}$ IS Medium AND THEN Range_of_$X_{m,n}$ IS High If the set of rules that describes the dynamic evolution of the cellular network is known, the value of the single state variable associated with the individual cell is updated in the manner expressed by a flow diagram shown in FIG. 3.

The flow diagram has five functional blocks therein which are cascade connected to one another, with feedback provided between an end block and a second block.

An initial block effects the acquisition of the state variables $X_{m,n}$ and Range_of_$X_{m,n}$ associated with the condition of the single network cell at the initial point in time.

These values are transferred to a second block, connected downstream from the initial block, which effects the conversion of these state variables to fuzzy logic quantities for subsequent processing by the sets of rules $R_1$ and $R_2$.

A third block, connected downstream from the second block, will receive the value of the output fuzzy quantity delta $X_{m,n}$ that results from the second block processing.

The third block effects a necessary defuzzyfying operation to obtain the corresponding true value of that fuzzy quantity.

The value from the third block is used by a fourth block to decide, in the event that the defuzzyfied quantity delta $X_{m,n}$ is zero or below a predetermined threshold, that the processing of the value of the state variable $X_{m,n}$ associated with the individual cell should be terminated.

Where the value of delta $X_{m,n}$ is non-zero, the end block will receive said value delta $X_{m,n}$ from the fourth block, and add it algebraically to the initial value of the state variable $X_{m,n}$ to yield the new value of $X_{m,n}$ at a subsequent point in time.

The end block will also place the updated value of $X_{m,n}$ on the second block input, so that the future values of $X_{m,n}$ at later points in time can be determined.

The control of the dynamic evolution of the generic cellular network by the above series of operations can be performed by a fuzzy rule processor, as suggested in the scientific article COLLECTIVE BEHAVIOUR OF CELLULAR FUZZY SYSTEM FOR NEW PARADIGM OF COMPUTATION, page 2, FIG. 2.

In particular, the above-referenced article suggests that the W.A.R.P. fuzzy processor manufactured by SGS-Thomson S.r.1. may be used.

While achieving its objective, this proposal is not devoid of shortcomings.

For example, where the number of the state variables associated with the number of fuzzy cells that make up the generic cellular network is large, the processor will be unable to simultaneously determine the states of all the cells, because all of them cannot be processed in parallel.

Therefore, the processor operates separately on different subsets of cells in the cellular network in a sequential manner. This causes its processing rate to be slower.

A fast response is essential where these architectures are to be implemented in image processing applications.

For example, the use of a general-purpose fuzzy processor of the W.A.R.P. type for such processing defines an upper limit of two hundred and fifty six processable rules, which is regarded as insufficient to process images by simple fuzzy procedures, and a respective number of input terminals and output terminals of sixteen and four, associable with the states of their respective cells.

Thus, specific modular structures which are identical with one another are desirable, to facilitate integration on semiconductor circuits for large volume manufacture. In this manner, the numbers of the processor inputs and outputs are not tied to that of the cellular network dimensions.

The underlying technical problem is to provide an architecture of a cellular network, as well as a related cellular network processor, which has such constructional and functional features as to allow fuzzy logics rules to be processed in the manner outlined above, thereby overcoming the limitations and shortcomings previously mentioned in connection with the background art.

SUMMARY OF THE INVENTION

The primary idea on which the present invention is based is one having the cellular network divided into a plurality of subareas, each leading an independent life of the others through the dynamic evolution of the system.

These subareas interact with one another to exchange information on the states of those cells which, by lying close to or within a range of radius r from a subarea boundary, or at the outward periphery of the subarea, are bound to affect the dynamic evolution of adjacent subareas with respect to the subarea in which they belong.

On the grounds of this idea, the technical problem is solved by a modular architecture of a cellular network being of the type indicated above and in which at least one of the cellular elements includes a submatrix of cellular elements.

In this way, the cellular architecture is given a modular configuration that facilitates both its integration on semiconductors in the form of integrated electronic circuits for large volume manufacture, and the integration on boards of several processors of the same type working in parallel.

Another advantage which is obtained is related to the architecture management, which is facilitated by each submatrix being controlled by an individually dedicated device.

The last-mentioned device is a fuzzy logic processor adapted for communication to other processors of the same type. In essence, each fuzzy processor can be connected to other processors of the same type to implement a parallel architecture of the modular type.

Furthermore, in accordance with the invention, the cellular network architecture is adapted for application to a three-dimensional field wherein a cellular element is identified by three coordinates.

By further expansion of the inventive principle, a cellular network may be thought of which can be applied to a multi-dimensional field wherein a cellular element is identified by an n-th number of co-ordinates N.

An application for a multi-dimensional cellular network could be related, for instance, to the processing of color images, with each image pixel being associated cell vectors instead of a single fuzzy cell.

This is specially advantageous in that the three fundamental components of a pixel color (red, green, blue) can be processed concurrently with the pixel brilliance.

The features and advantages of an architecture and a cellular network processor according to the invention will be apparent from the following description of embodiments thereof, given by way of non-limitative example with reference to the accompanying drawings.

DETAILED DESCRIPTION

Figure 1:
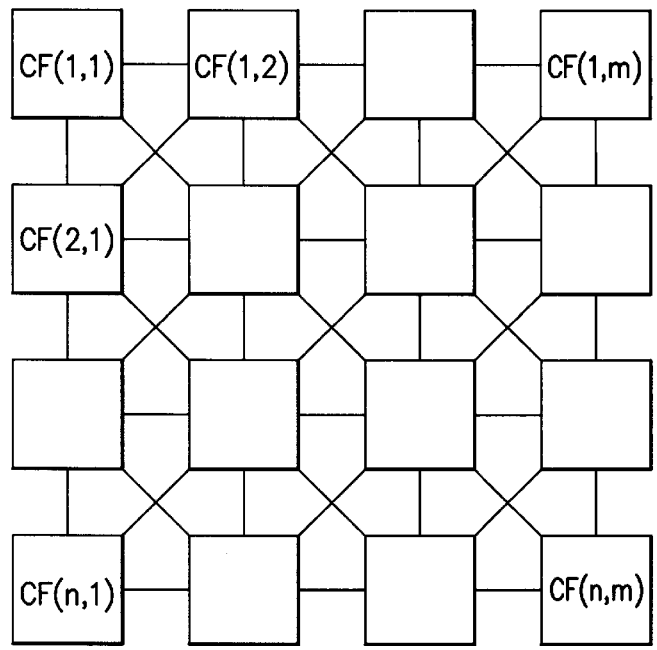
FIG. 1 is a schematic representation of a cellular network according to the prior art.
Figure 2:
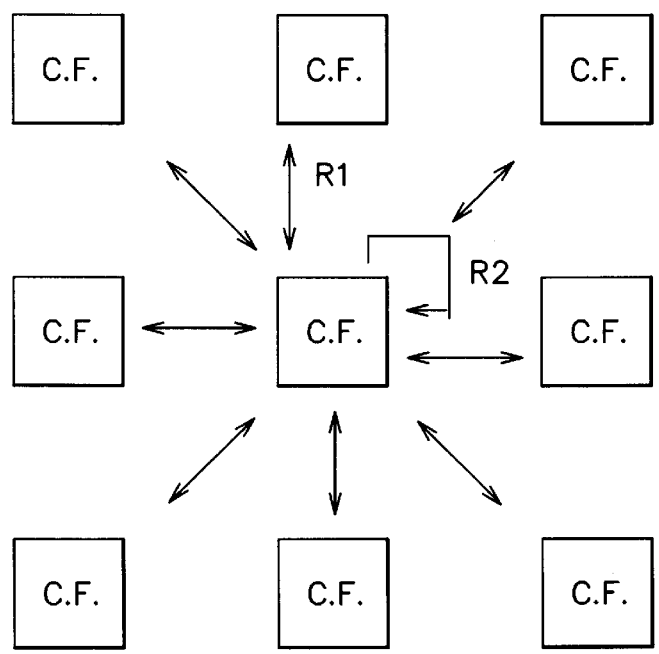
FIG. 2 illustrates possible connections and interactions of a generic cell in a fuzzy cellular network.

Referring to the drawing figures,

FIG. 1 is a schematic representation of a prior art cellular network. FIG. 2 illustrates possible connections and interactions of a generic cell in a fuzzy cellular network.

Generally and schematically shown at 4 is a cellular network architecture embodying this invention and featuring simplified control of its dynamic evolution, as well as allowing for easier integration on semiconductors in the form of integrated circuits for large volume manufacture.

Figure 4:
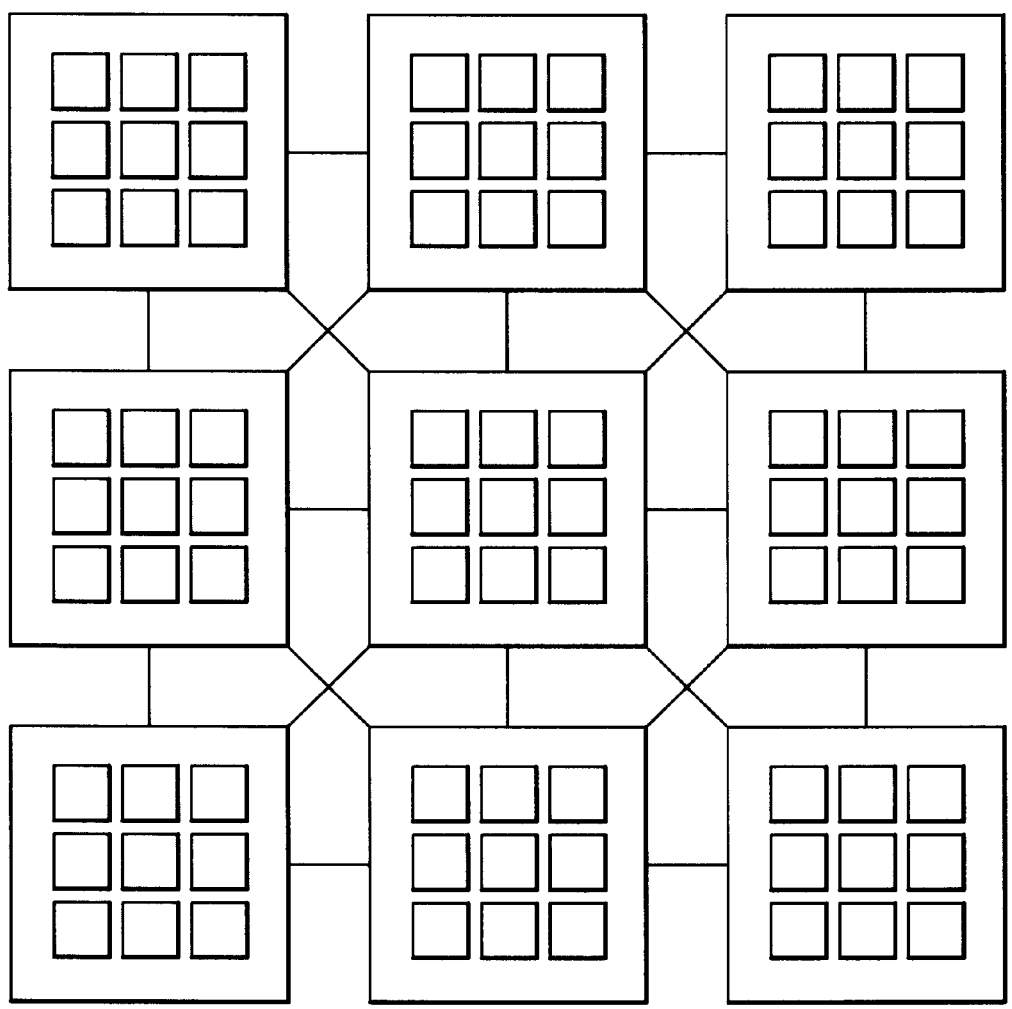
FIG. 4 shows the modular architecture of a fuzzy cellular network according to the invention.

FIG. 4 illustrates a specific case of a cellular network of the nine-by-nine (9*9) type, where a subset of cells in a matrix-like structure called submatrix is identified by thicker-outlined squares in the figure.

Each submatrix comprises a three-by-three (3*3) matrix of cellular elements, such that all of the fuzzy cells which form the network are enclosed within said submatrices. Thus, the cellular network shown in FIG. 4 has been divided into a three-by-three (3*3) matrix of submatrices of cellular elements which interact with one another to exchange information.

The dynamic evolution of each submatrix is governed by a set of rules which can be expressed as fuzzy logic constructions.

These rules are similar to those previously described in connection with the prior art, wherein the state of a single cell in a given submatrix is made to depend on a set of rules ($R_1$ U $R_2$) being the combination of a first set $R_1$ and a second set $R_2$.

The determination of the value of the future state variable, that is at a subsequent time to the initialization time, of a generic cell is effected by processing said set of rules on the basis of given input values.

These values are respectively dependent on the state variable of the cell whose future state is to be revealed, and on the other state variables of adjacent cells to said base cell within a range of radius r.

The application of these rules becomes more complicated where the reference cell, namely the cell whose future state is to be determined, and its adjacent cells within a range of radius r are formed by cells which belong to different submatrices.

A typical case is that of a cell being located at the outward periphery or the boundary of a first submatrix, and cells within the range of radius r located outside said submatrix.

Accordingly, there is a need for adjacent submatrices to be able to exchange information with one another in order that each of them can, within the aforementioned rules governing the dynamic evolution of each submatrix, be supplied the necessary data to determine the future state of each of the cells therein.

The dynamic evolution of each submatrix and the exchange of data between submatrices are controlled by a number of cellular network processors, identical with one another, as described hereinafter.

As for the diagram of FIG. 4, special attention is to be given to the cells located at the outermost periphery of the cellular network which do not fill the condition for a range of radius r.

Two different kind of solutions can be adopted to extend the rules, binding the dynamic evolution of the cellular network, to the above cells, namely:

application of a particular set of rules (other than the set $R_1$ U $R_2$ which is ruling the system general evolution) where a cell whose future state is to be determined, locates at the boundary of the cellular network;

creation of a virtual auxiliary boundary, whereby the cells located at the outermost periphery of the cellular network also can have a range of radius r.

This auxiliary boundary is achieved by storing the values of state variables associated with dummy cells into suitable supports, such that they can be made available whenever the future state of a cell located at the network boundary requires to be computed.

With the latter solution, a modularity of approach is ensured which is uniform for all the cells in the network, although additional processing is involved in creating the auxiliary boundary.

The processing of the fuzzy cellular network can be provided by connecting a plurality of functional blocks to one another by control, data, and address buses.

These buses serve a transmission function for electronic control, address, and data signals through the above functional blocks.

Figure 5:
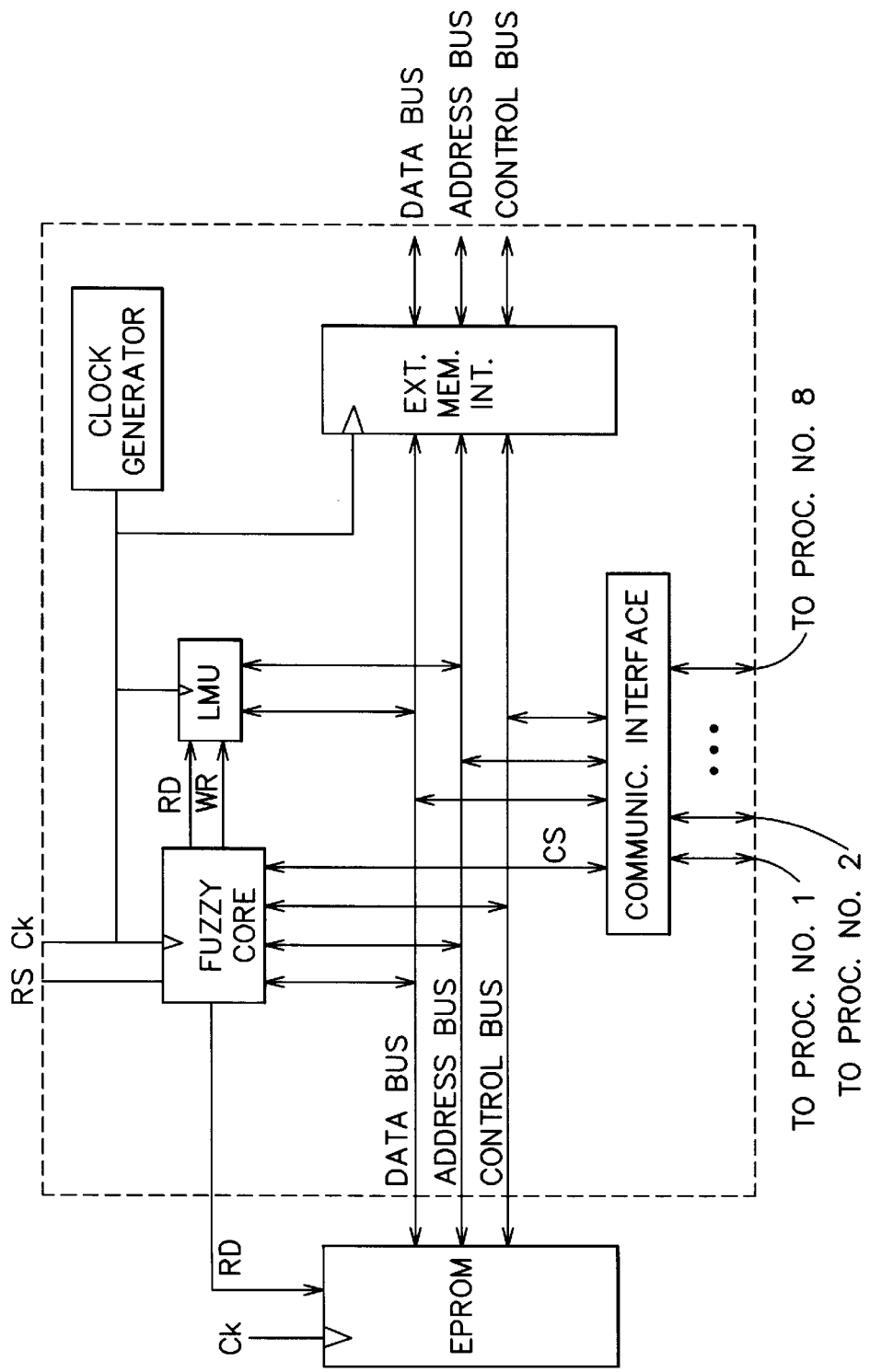
FIG. 5 is a block diagram of the fuzzy cellular network processor, according to the invention.

The processor is shown schematically in FIG. 5 to comprise: a plurality of functional blocks called FUZZY CORE, LOCAL MEMORY UNIT (LMU), EXT. MEMORY INTERFACE, COMMUNICATION INTERFACE, and CLOCK GENERATOR; a backbone formed of data, control, and address buses; and a plurality of input/outputs.

A first block, designated Fuzzy CORE, functions essentially as the processing unit. This block mainly operates to compute, in conformity with the general rules $R_1$ and $R_2$ enforced for each cell in the three-by-three (3*3) submatrix, the respective future state at a subsequent time t+1, once the values of the state variables of the adjacent cells within a range of radius one are known at a given prior time t. This block Fuzzy CORE is, therefore, to acquire the values by carrying out read and write operations on the functional blocks LMU and EXT.MEM.INT which are managed by the plurality of buses and suitable synchronization signals denoted by WR and RD. The other information about the parameters of the fuzzy rules needed to determine the dynamic evolution of the submatrix being controlled by the processor is acquired by read operations from a storage block outside the processor, being of the EPROM, FLASH or an equivalent type. All of the operations mentioned this far can be reset by suitably driving a signal, designated RS, which is an input to the block FUZZY CORE.

EPROM is a storage block connected externally to a first set of input/output terminals of the processor matching the plurality of buses. This block is enabled by FUZZY CORE for a read operation, through the synchronization signal RD and the plural buses, in order to supply the fuzzy core with the parameters of the fuzzy rules to be used in computing the future state.

LOCAL MEMORY UNIT (LMU) is an internal memory block which is used for storing the end and intermediate values of the fuzzy cell state variables during the dynamic evolution of the cellular network. This block's read/write operation is enabled by FUZZY CORE through the read/write synchronization signals (RD, WR). The exchange of information with the other blocks in FIG. 5 takes place over data, address, and control buses.

EXT. MEMORY INTERFACE is a block arranged to manage all of the input/output operations related to data being processed. Each input data or information item is presented in digital form with an appropriate number of bits, preferably eight bits, to allow of the use of ordinary banks of memories set up as cells of one byte. In a specific application, e.g. image processing, the above choice allows the brilliance of an individual pixel to be represented as two hundred and fifty six levels of gray.

COMMUNICATION INTERFACE is a block which is enabled by the block FUZZY CORE through a synchronization signal CS. It manages the communications between identical processors controlling adjacent submatrices, so as to receive the information (values of the state variables of cells within a range of radius with respect to a base cell) and define the range of radius of all the cells in the submatrix.

CLOCK GENERATOR is a block generating a clock signal which is distributed to the inputs of the blocks EPROM, LOCAL MEMORY UNIT, EXT. MEMORY INTERFACE, and COMMUNICATION INTERFACE for the purpose of synchronizing the write/read operations of FUZZY CORE into/from these blocks.

Figure 6:
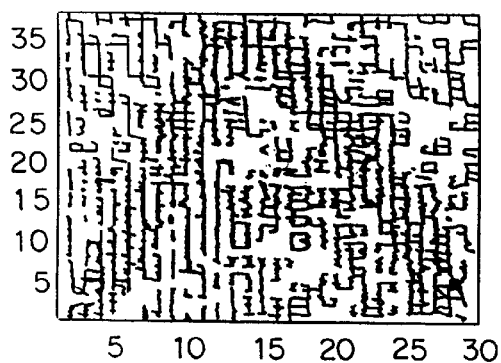
FIG. 6 shows an image as affected by gaussian noise.

A possible use for the cellular architecture in the field of image processing, with particular reference to a black/white image which is affected by gaussian noise as shown in FIG. 6, will now be described. By associating a cell from the fuzzy network with each image pixel, the image can be re-processed to suppress the noise that is detracting from the image quality. Accordingly, it is necessary to define which are the input variables, the output variables, and their membership functions in the universe set. The universe set is represented by the plus-one-minus-one [+1;−1] interval, with the value plus-one being associated to the pixel of black and the value minus-one with the pixel of white.

Figure 3:
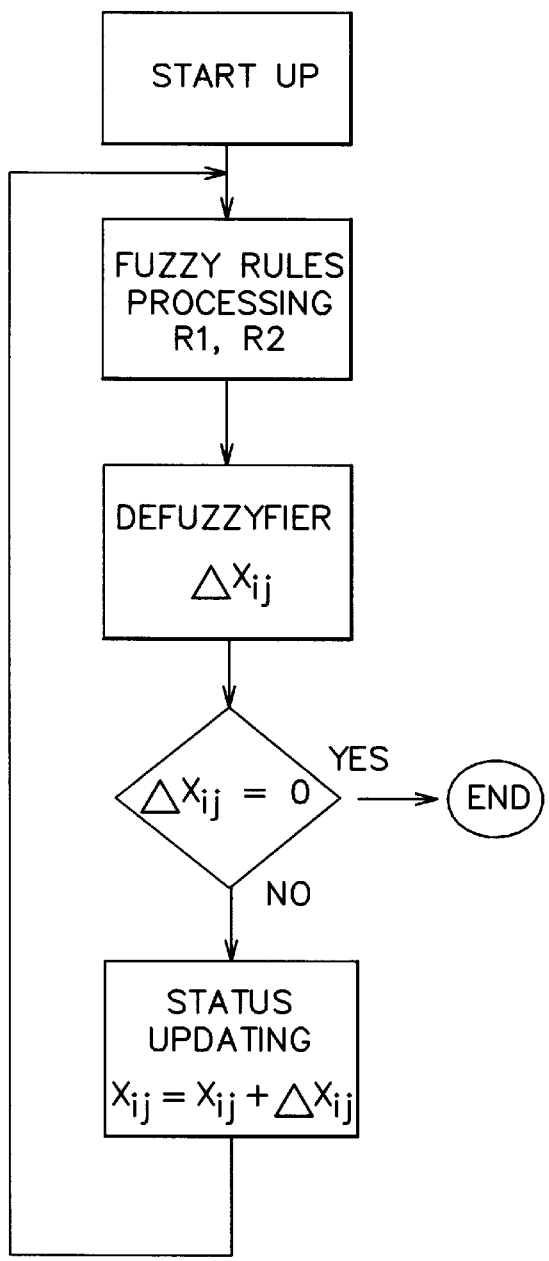
FIG. 3 is a functional diagram of individual cell state updating.

The input variables are the state variables associated with each pixel and denoted by the symbol $X_{i,j}(k)$, where the indexes i and j determine the position of the generic pixel within the image, and k designates the k-th iteration (or processing). The output variables are equal in number to the input variables and denoted by the symbol $delta(x)_{i,j}$. The value $delta(x)_{i,j}$ is the variation associated with the generic state variable $X_{i,j}$ needed to determine its dynamic evolution in the manner represented by the flow diagram of FIG. 3.

Figure 9:
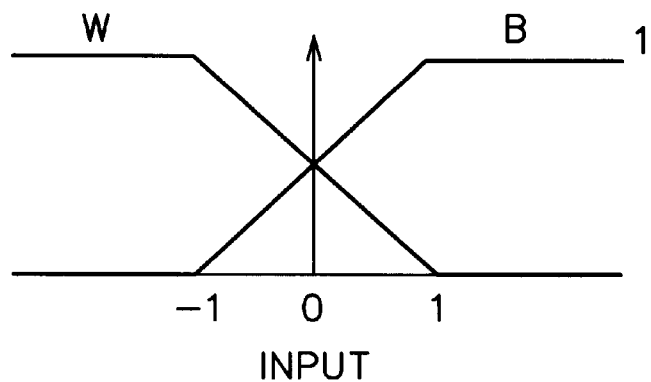
FIG. 9 illustrates the membership functions of the input variables.
Figure 10:
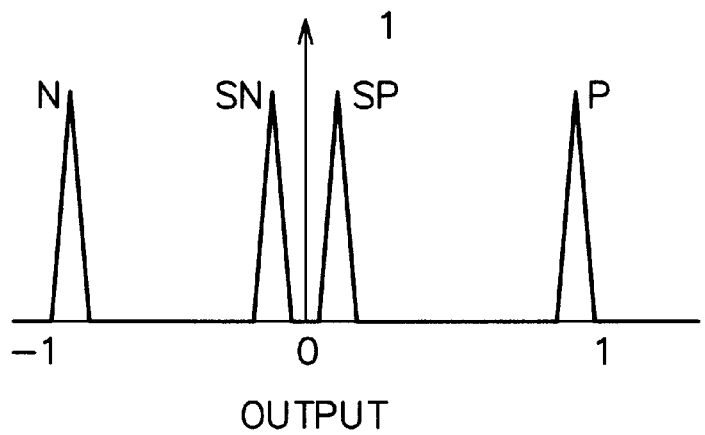
FIG. 10 illustrates the membership functions of the output variables.

The membership functions of the input variables are shown in FIG. 9, as denoted by the symbols W and B making explicit reference to the possible black and white hues of the generic pixel. Shown in FIG. 10 are the four output membership functions, respectively referenced N, P, SP, SN, which identify the four possible values that can be attributed to the generic output variable $delta(x)_{i,j}$.

To complete the picture of the parameters required to determine (bind) the dynamic evolution of the cellular network system, the set of rules $R_1$, $R_2$ should be defined such that it expresses suitable bonds to suppress the noise affecting the image to be processed.

Figure 7:
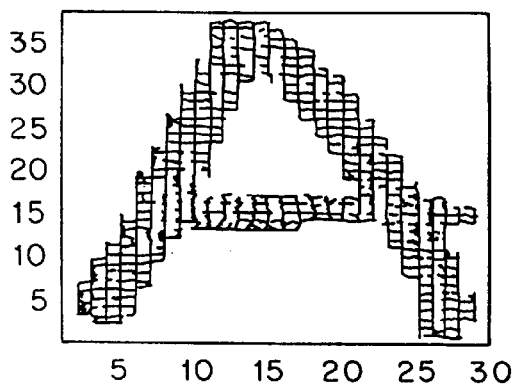
FIG. 7 shows the image of FIG. 6 after re-processing through a fuzzy cellular network.

In the specific case under consideration, wherein FIG. 7 is obtained from the image in FIG. 6, the decision has been made to use a range of radius of one defining the distance of interaction between adjacent cells. Sets of rules, $R_1$, $R_2$, can be defined as follows:

SET $R_1$

IF $X_{i,k}(k)$ IS W AND $n_{i,j}$ IS W THEN $delta(x)_{i,j}$ IS N

IF $X_{i,k}(k)$ IS B AND $n_{i,j}$ IS B THEN $delta(x)_{i,j}$ IS P

IF $X_{i,k}(k)$ IS W AND $n_{i,j}$ IS B THEN $delta(x)_{i,j}$ IS SP

IF $X_{i,k}(k)$ IS B AND $n_{i,j}$ IS W THEN $delta(x)_{i,j}$ IS SN

SET $R_2$ $$n_{i,j}(x) = (x_{i-1,j}(k) + x_{i+1,j}(k) + x_{i,j-1}(k) + x_{i,j+1}(k))$$

For simplicity, the interactions between adjacent cells with range one, as described by the set of rules $R_2$, have been synthesized into an algebraic formula rather than the constructions of fuzzy logic.

Figure 8:
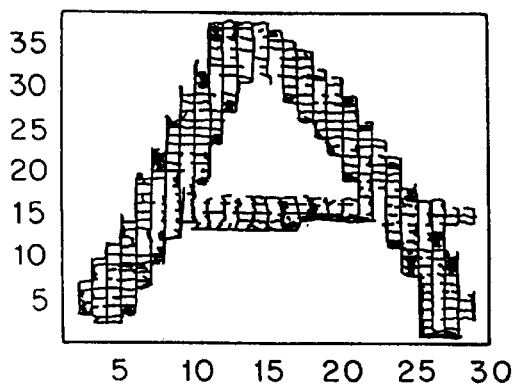
FIG. 8 shows the original image of FIG. 6, with the gaussian noise removed.

FIG. 8 shows the original image of FIG. 6, with the gaussian noise removed. The good results obtained so far point to the use of these fuzzy cellular architectures for image processing to suppress noise, as well as for image segmenting and compressing.

The architecture proposed herein can also be used for other applications, such as to modularize complex physical phenomena involving interaction mechanisms between identical individuals on which the overall dynamic evolution is based. For example, the architecture can be applied to partial derivative equations, reaction-diffusion equations, cellular automata, fractal geometries including their applications to fluid dynamics, meteorology, and artificial life.

In conclusion, the architecture and device according to the invention have obvious advantages of modularity and structural simplicity, as well as good computational capabilities, to be obtained through the use of fuzzy logics in integrated form. Although two dimensional matrices have been illustrated, three or more dimensions can be implemented with the modular cellular structure. For three dimensions, each cellular element $C_{m,n,o}$ is represented by three coordinates m, n, and o. For multiple dimensions, each cellular element $C_{m,n,o,p\ldots z}$ represented multiple elements m, n, o. P . . . z.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A modular architecture of a cellular network for improved large-scale integration comprising:

a plurality of fuzzy cellular elements ($C_{m,n}$) interconnected to form a matrix of elements having at least m rows and n columns, the row and column numbers describing the location of each element; and wherein at least one of said cellular elements includes:

a plurality of cellular subelements ($C_{i,h}$) interconnected to form a submatrix having at least i rows and h columns.

2. An architecture according to claim 1, wherein the plurality of cellular elements are applied to a three-dimensional field such that each cellular element ($C_{m,n,o}$) is described by three coordinates m, n, o.

3. An architecture according to claim 1, wherein the plurality of cellular elements are applied to a multi-dimensional field such that each cellular element ($C_{m,n,o,p\ldots z}$) is described by a number N of co-ordinates (m,n,o,p . . . z) equal to the number of dimensions.

4. An architecture according to claim 1, wherein a state of a first cell at a first point in time is a function of a state of said first cell at a point in time directly preceding said first point in time, and of states of cells within a range of radius r of said first cell, wherein the range of radius is defined by a specific function $(\max(|k-m|,|l-n| \leq r)$, wherein the coordinates m and n identify a location of the first cell, the co-ordinates k and l identify a location of a cell being with the range of radius said first cell and utilized to determine a state variable (Range_of_$X_{m,n}(t)$), and wherein a state of a single cell can be obtained by sets of rules ($R_1$,$R_2$) which respectively define the temporal dynamic evolution of a single isolated cell and the overall temporal dynamic pattern of the cellular network within a range of radius r, as defined by the interactions between said cellular elements as either expressed by one of fuzzy logic rules and flow diagrams.

5. An architecture according to claim 1, wherein at least one of said fuzzy cellular elements and fuzzy cellular subelements is controlled by a fuzzy cellular network processor.

6. An architecture according to claim 1, wherein at least one of said one fuzzy cellular submatrix has its temporal dynamic evolution controlled by an individually dedicated fuzzy cellular network processor.

7. An architecture according to claim 6, wherein said cellular network processor communicates with processors of the same type.

8. An architecture according to claim 6, wherein said cellular network processor comprises a plurality of functional blocks interconnected by means of control, address, and data buses operative to respectively pass control, address, and data signals between said functional blocks.

9. An architecture according to claim 8, wherein one of said functional blocks is a computer/control device for respectively processing fuzzy logics rules and timing said control, address, and data signals.

10. An architecture according to claim 8, wherein one of said functional blocks is an internal memory block for storing the states ($X_{m,n}(t)$) of said cellular elements at different initial and intermediate points in time.

11. A device for processing fuzzy logics rules to control the temporal dynamic evolution of the states of cellular elements ($C_{m,n}$) of the fuzzy type interconnected to form a matrix of elements with at least m rows and n columns, wherein the row and column numbers describe the location of each element, the device comprising:

a plurality of functional blocks interconnected by a linking backbone of data, address, and control buses to a plurality of input/output terminals.

12. A device for processing fuzzy logics rules according to claim 11, wherein the plurality of functional blocks include:

a fuzzy logics rule computing unit block;

a memory block for storing internal intermediate and end data, being enabled for writing/reading by appropriate signals which are synchronized to a temporal reference signal;

a memory block for storing external data to be processed, being enabled for reading by appropriate signals which are synchronized to a temporal reference signal;

a memory block outside the processor for storing fuzzy rules, being enabled for writing/reading by an appropriate signal which is synchronized to a temporal reference signal;

an interface block for communicating with other processors of the same type in the outside world for the purpose of making data from one processor available to the other processors of the same type, and whose operation is controlled by a processor enable signal;

a timing block for generating a necessary reference signal for write/read or read-only operations by the computing unit into/from data-containing blocks.

13. A cellular fuzzy network, comprising:

a matrix of fuzzy elements interconnected to communicate current values for each fuzzy element;

wherein at least one of said fuzzy elements includes a submatrix of fuzzy subelements interconnected to communicate current values for each fuzzy element; and wherein each of said fuzzy subelements includes:

a fuzzy processor for determining a next value based upon a current value of the fuzzy subelement and current values of adjacent fuzzy elements and fuzzy subelements; and a communication section, connected to the fuzzy processor, for communicating with other fuzzy elements and fuzzy subelements.

14. The cellular fuzzy network according to claim 13, wherein each of said fuzzy subelements further includes at least one memory connected to said fuzzy processor and said communication section for storing current values for said fuzzy elements and fuzzy subelements.

15. The cellular fuzzy network according to claim 13, wherein said fuzzy processor of each of said fuzzy subelements includes rules defining a next value of a corresponding subelement based upon a current value of the corresponding subelement and current values of fuzzy elements and fuzzy subelements within a predefined radius of the corresponding subelement; and wherein each communication section communicates with the fuzzy elements and fuzzy subelements to obtain the current values of fuzzy elements and fuzzy subelements with said predefined radius.

16. A method of operating a fuzzy network, including a matrix of a plurality of interconnected fuzzy elements, at least one of the fuzzy elements including a submatrix of a plurality of interconnected fuzzy subelements, the method comprising the step of:

storing a set of rules within each fuzzy subelement defining a next value of a corresponding fuzzy subelement upon a current value of the corresponding subelement and current values of fuzzy elements and fuzzy subelements within a predefined radius of the corresponding subelement;

communicating between said fuzzy elements and fuzzy subelements so that each fuzzy subelement receives the current values of the fuzzy elements and fuzzy subelements with said predefined radius; and processing said set of rules within each fuzzy subelement to determine a next value of the corresponding subelement.

17. The method of claim 16, further comprising the step of:

storing said current values for said fuzzy elements and fuzzy subelements within said predefined radius at each of said fuzzy subelements.

* * * * *

UNITED STATES PATENT AND TRADEMARK OFFICE
CERTIFICATE OF CORRECTION

PATENT : 6,061,672

DATED : May 9, 2000

INVENTOR(S) : Riccardo Caponetto, Luigi Occhipinti, Luigi Fortuna, Gabriele Manganaro and Gaetano Giudice It is certified that error appears in the above-identified patent and that said Letters Patent is hereby corrected as shown below:

Column 5, line 1 should read as follows:

Generally and schematically shown in Figure 4 is a cellular

Signed and Sealed this

Twentieth Day of March, 2001

Attest:

NICHOLAS P. GODICI

Attesting Officer

Acting Director of the United States Patent and Trademark Office